United States Patent

[11] 3,578,358

[72] Inventor Donald F. Reynolds
 4415 E. Textile Road, Ypsilanti, Mich. 48197
[21] Appl. No. 851,212
[22] Filed Aug. 19, 1969
[45] Patented May 11, 1971

[54] FRAME HITCH AND STEP BUMPER
 6 Claims, 7 Drawing Figs.
[52] U.S. Cl. .................................................. 280/500, 293/69, 280/495
[51] Int. Cl. ...................................................... B60d 1/14
[50] Field of Search ........................................... 280/495, 500, 501, 491, 406.1; 296/30

[56] References Cited
 UNITED STATES PATENTS
 1,381,761  6/1961  Stansbury et al. ............ 280/491X

| | | | |
|---|---|---|---|
| 2,747,892 | 5/1956 | Jones | 280/495X |
| 2,889,155 | 6/1959 | Sandage | 280/495X |
| 3,281,164 | 10/1966 | Reaser | 280/501 |
| 3,445,125 | 5/1969 | Stewart | 280/150.5X |
| 3,485,514 | 12/1969 | Stewart | 280/501 |
| 3,501,170 | 3/1970 | Da Valle | 293/69X |

Primary Examiner—Benjamin Hersh
Assistant Examiner—John P. Silverstrim
Attorney—Olsen and Stephenson

ABSTRACT: An accessory for mounting on the frame of a motor vehicle, to provide a frame hitch assembly adapted to be used with the original equipment bumper of the vehicle or which is adapted to support an accessory step bumper. The frame hitch assembly has mounting end plates and reinforcing torque bars adapted for mounting the hitch assembly on the frame without altering the physical characteristics of the frame.

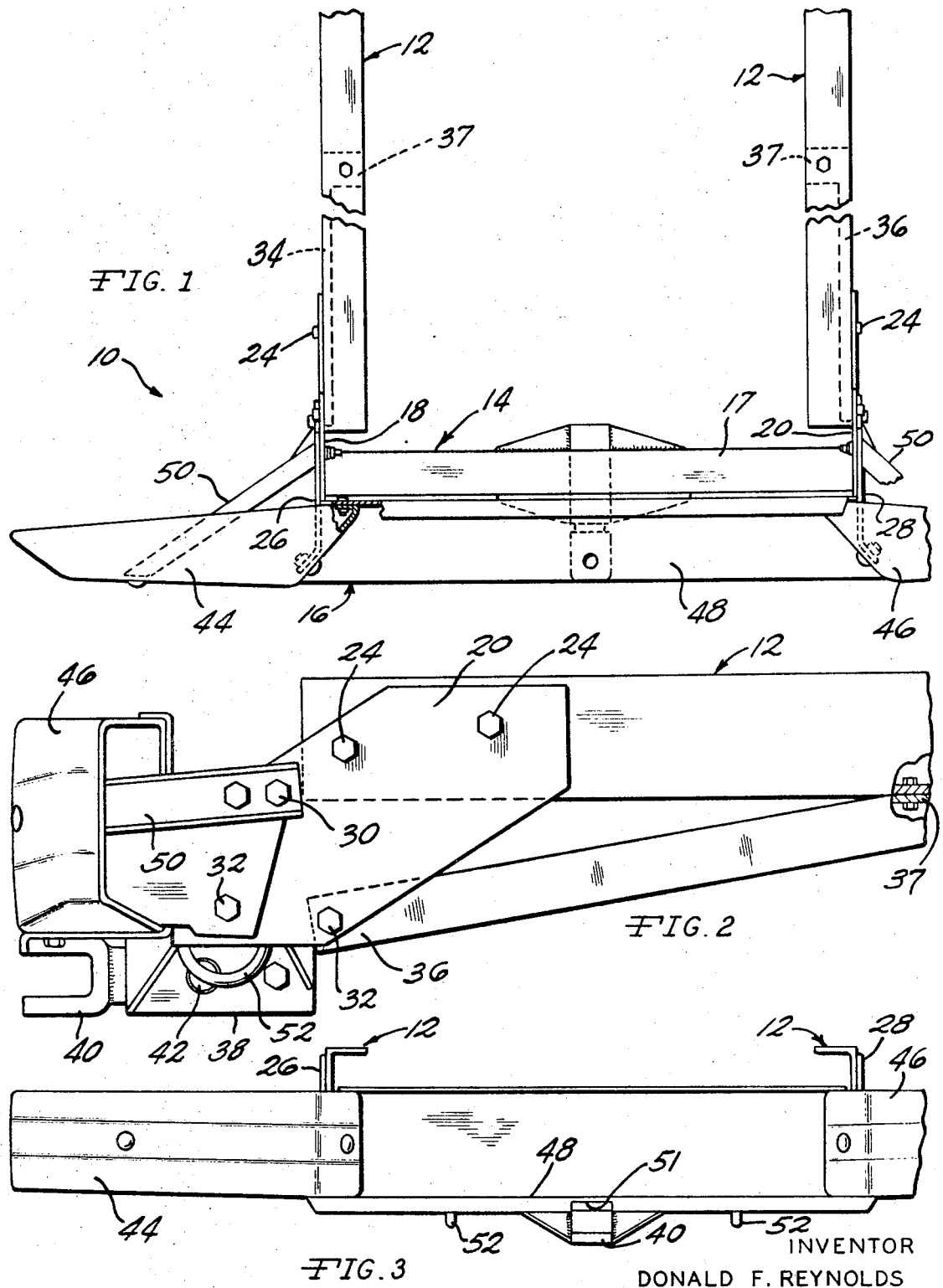

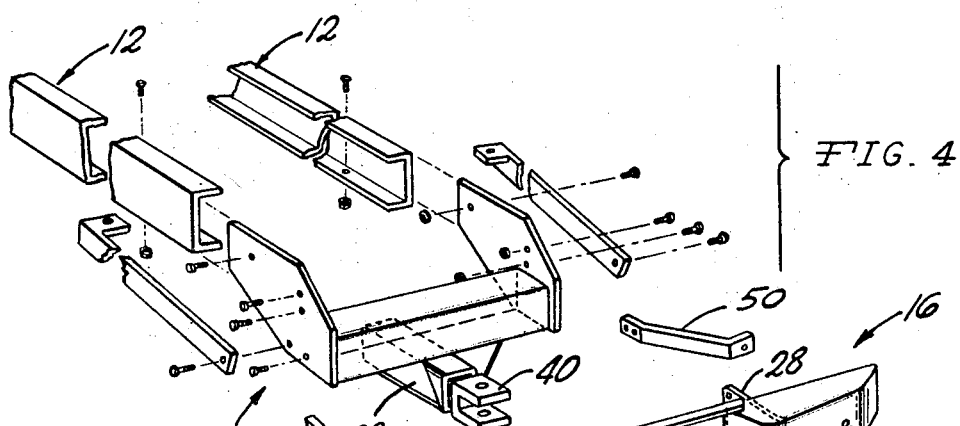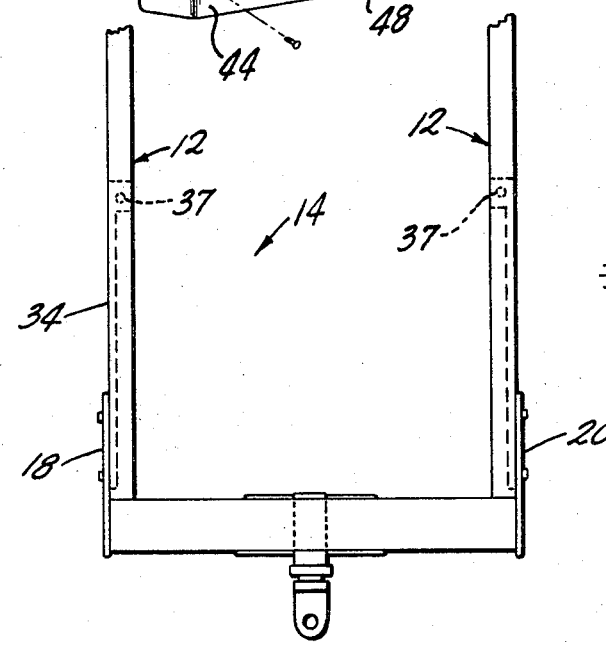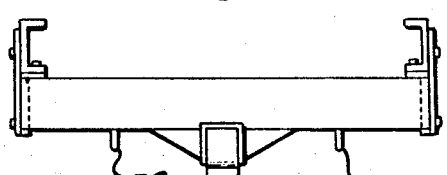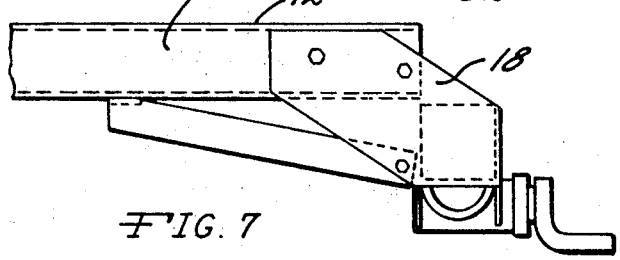

3,578,358

FRAME HITCH AND STEP BUMPER

BACKGROUND OF THE INVENTION

The present invention relates to a frame hitch and step bumper assembly and to a frame hitch assembly, per se, adapted to be mounted on the frame of a vehicle, such frame hitch assembly being adapted to fit into the original equipment bumper, if desired, and to be used with a conventional clevis, ball or load equalizer hitch system.

Numerous efforts have been made in the past to provide economically a suitable frame hitch and also a step bumper hitch assembly for use with pickup trucks and the like, without marked success. In most instances the frame hitch assemblies that have been provided have required modification of the frame of the vehicle in order to mount the assembly, thereby weakening the frame structure. Other assemblies have been designed to be mounted on the frame of the vehicle without altering the frame, but these assemblies have limited usage and are unduly cumbersome or they have been of a design having limited load carrying capacity.

SUMMARY OF THE INVENTION

The present invention has overcome the shortcomings of the prior art and provides a frame hitch which is constructed and arranged for greater adaptability and usage and so as to have a substantial load carrying capacity, which can readily be installed on the frame of a vehicle without altering or weakening the frame construction of the vehicle and which can readily be adapted to receive (1) a step bumper especially designed for the frame hitch, (2) a step bumper of the type originally installed on the vehicle, or (3) a step bumper which can be added to the original equipment bumper of the vehicle.

According to one form of the present invention, a frame hitch is provided for mounting on the frame of a motor vehicle comprising a transverse support tube, end plates mounted on opposite ends of the support tube, each plate extending upward above the transverse support tube and having means for mounting them on the outer sides of the motor vehicle frame with the transverse support member positioned to the rear of and below the frame. Bars are connected to the lower portions of the end plates and project forward and upward for attachment to the frame so as to function as reinforcing members, and a generally tubular-shaped member is secured to the undersurface of the support tube and is adapted to receive a load equalizer hitch system or other conventional types of hitch assemblies.

The frame hitch is constructed and arranged so that a conventional bumper comprising original equipment on a motor vehicle can be mounted directly over the ends plates and thereby be supported by the frame of the vehicle, and if desired, a step plate can be mounted on the upper surface of the original equipment bumper and likewise be supported by the frame hitch.

Accordingly, it is among the objects of the present invention to provide an improved frame hitch and an improved step bumper hitch assembly for mounting on frames of motor vehicles.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 1 is a fragmentary top plan view of one embodiment of the invention showing the step bumper and hitch assembly mounted on the vehicle frame;

FIG. 2 is a fragmentary side elevational view of the step bumper and hitch assembly;

FIG. 3 is a fragmentary rear elevational view of the step bumper and hitch assembly;

FIG. 4 is a fragmentary exploded view illustrating fragments of the frame of the vehicle, the frame hitch and the step bumper assembly;

FIG. 5 is a top plan view of a frame hitch assembly, per se, mounted on a vehicle frame;

FIG. 6 is an end elevational view of the frame hitch assembly shown in FIG. 5; and FIG. 7 is a fragmentary side elevational view of the frame hitch assembly illustrated in FIG. 5 with a drawbar mounted in place.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The combination step bumper and frame hitch assembly 10 is shown mounted on the frame 12 of a motor vehicle, and includes the frame hitch assembly 14 and the step bumper 16.

The frame hitch assembly 14 has a transverse support member or tube 17 which is generally square in cross section, and secured to opposite ends thereof in a suitable manner, such as by welding or the like, are end plates 18 and 20. The latter extend forward and upward from the transverse support tube 17 and are secured to the outer sides of the motor vehicle frame 12 by means of a plurality of bolts 24. By virtue of this arrangement the transverse support tube 17 is positioned to the rear of and below the frame 12 as can be seen best in FIG. 2. The location of the holes for the bolts 24 are determined by bolt holes that are conventionally located in the frame 12 for the purpose of mounting the original equipment bumper, so that weakening of the frame 12 by insertion of additional bolt holes therein for mounting purposes of the hitch assembly 14 is avoided. The end plates 18 and 20 also have bolt holes located therein for mounting the brackets 26 and 28 which project forward from the step bumper 16. Suitable bolts 30 and 32 can then be used to secure the bumper 16 to the end plates 18 and 20.

The frame hitch assembly 14 also includes a pair of reinforcing bars 34 and 36 which are secured to the end plates at one end by the bolts 32 and extend forward and upward to the undersides of the frame 12 where the terminal end has an integral flange 37 to fit against the lower surface of the frame 12 and to be bolted thereon.

Secured to the undersurface of the transverse support tube 17 is a tubular member 38 into which is adapted to be inserted a drawbar 40. The latter can be secured in place by means of the clevis pin 42.

The step bumper 16 has bumperettes 44 and 46 at opposite ends and a step plate 48 extending between the bumperettes. Suitably attached to each bumperette is a channel-shaped reinforcing arm 50 which normally is secured in place by bolts at its one end to the associated bumperette and extends to the associated bracket 26 or 28 to which it is also normally secured by a bolt. The step plate 48 is notched at 51 for receiving the drawbar 40 so that the step plate is retained in fixed position on the tubular member 38 and is supported thereby. As is recognized by those skilled in the art, the tubular member 38 is located midway between the end plates 26 and 28 and is of a construction so as to be adapted to receive a conventional load equalizer hitch bar system. Also suitably secured to the underside of the transverse support tube 17 are the eyelets 52 for securing conventional safety chains.

FIGS. 5, 6, and 7 show an arrangement whereby the frame hitch assembly 14 can be mounted directly to the frame 12 and can be supported thereon in the absence of a bumper assembly. As there shown, the end plates 18 and 20 are connected to the frame 12 and reinforcing members 34 and 36 are each connected at one end to end plates 18 or 20 and at the other end to the lower surface of the frame members 12. The remaining portions of the hitch are essentially the same as those previously described when a bumper assembly is mounted on the hitch assembly. If desired, the flange 37 may be omitted and the reinforcing members 34 and 36 can be secured to the side surfaces of the frame 12.

From the foregoing description it will be understood that a frame hitch has been provided which can readily be mounted on the frame of a motor vehicle and the hitch can be used either with or without the step bumper. Also, if desired, a conventional bumper may be utilized with the present invention, and a step plate (not shown) can then be mounted on the upper surface of the conventional bumper, and the step plate can also be secured in place to the end plates 18 and 20. Thus, the frame hitch is adapted for use in a variety of arrangements and can readily be installed on the frame of the motor vehicle without altering the physical characteristics of the frame. The end plates and reinforcing members are located so as to permit maximum loads to be transmitted through the drawbar without harmful effect to the vehicle. Also, optimum load distribution from the frame hitch to the vehicle is realized.

I claim:

1. A hitch assembly for mounting on the frame of a motor vehicle, comprising a tubular transverse support member having a generally square cross section, end plates mounted on opposite ends of said transverse support member, each plate extending upward above the transverse support member and having means for mounting them on the outer sides of a motor vehicle frame with the transverse support member positioned to the rear of and below said frame, reinforcing bars connected to the lower portions of said end plates and projecting forward and upward for attachment to said frame, and a tube mounted on the lower wall of the square tubular transverse support member midway between said plates projecting rearwardly for receiving and supporting a drawbar, each of said reinforcing bars being secured at one end to the side of its associated plate and terminating at its other end in a plate turned inward adapted to fit on the lower surface of the vehicle frame, and each of said plates including means for securing brackets of a bumper thereto.

2. A bumper hitch assembly for mounting on the frame of a motor vehicle comprising a hitch assembly having a transverse support member, end plates mounted on opposite ends of said transverse support member, each plate extending upward above the transverse support member and having means for mounting them on the outer sides of a motor vehicle frame with the transverse support member positioned to the rear of and below said frame, reinforcing bars connected to the lower portions of said end plates and projecting forward and upward for attachment to said frame, drawbar attachment means mounted on a lower portion of said transverse support member midway between said plats projecting rearwardly for receiving and supporting a drawbar, and a bumper mounted on said hitch, said bumper having a pair of spaced brackets secured thereto which project forward and are secured to and supported by said end plates.

3. A bumper hitch assembly as is defined in claim 2, wherein said bumper includes a step plate extending between said brackets, said step plate overlying said drawbar attachment means and being supported thereon.

4. A bumper hitch assembly as is defined in claim 2, wherein said drawbar attachment means includes a tube welded to the undersurface of said support member.

5. In combination, a frame of a motor vehicle, a hitch assembly mounted on said frame comprising a transverse support tube, end plates mounted on opposite ends of said support tube, each plate extending vertically upward above the support tube and secured against the outer sides of said frame, with the support tube positioned to the rear of and below the rearward end of said frame, reinforcing bars connected to the lower portions of said plates extending forward and upward and connected to said frame, a tube for receiving a drawbar connected to the undersurface of said support tube and extending rearwardly therefrom, and a bumper mounted on said hitch assembly, said bumper having a pair of spaced brackets extending forward and secured to and supported by said end plates.

6. In combination, a frame of a motor vehicle, a hitch assembly mounted on said frame comprising a transverse support tube, end plates mounted on opposite ends of said support tube, each plate extending vertically upward above the support tube and secured against the outer sides of said frame, with the support tube positioned to the rear of and below the rearward end of said frame, reinforcing bars connected to the lower portions of said plates extending forward and upward and connected to said frame, a tube for receiving a drawbar connected to the undersurface of said support tube and extending rearwardly therefrom, a step bumper mounted on said hitch assembly, said bumper having a pair of spaced brackets extending forward and secured to said end plates, and a step plate supported on said drawbar tube.